United States Patent [19]

Magnusson et al.

[11] 4,049,632

[45] Sept. 20, 1977

[54] CHAIN EXTENDING POLYURETHANES WITH A LARGE EXCESS OF WATER

[75] Inventors: Alan B. Magnusson; Howard S. White, both of Lancaster, Pa.

[73] Assignee: Armstrong Cork Company, Lancaster, Pa.

[21] Appl. No.: 705,117

[22] Filed: July 14, 1976

[51] Int. Cl.² .................. C08G 18/10; C08G 18/30; C08G 18/82
[52] U.S. Cl. .................. 260/75 NE; 260/75 NH; 260/77.5 AA; 260/77.5 AM; 260/75 NA
[58] Field of Search .... 260/75 NH, 75 NE, 77.5 AA, 260/77.5 AM, 75 NA

[56] References Cited

U.S. PATENT DOCUMENTS

| | | | |
|---|---|---|---|
| 2,657,151 | 10/1953 | Gensel et al. | 260/75 NH |
| 2,968,575 | 1/1961 | Mallonee | 260/75 NH |
| 3,213,049 | 10/1965 | Heiss | 260/77.5 AA |
| 3,505,275 | 4/1970 | Sato et al. | 260/75 NE |
| 3,560,447 | 2/1971 | Bingham | 260/75 NE |
| 3,714,095 | 1/1973 | Reischl et al. | 260/29.2 TN |

*Primary Examiner*—H. S. Cockeram
*Attorney, Agent, or Firm*—Richard J. Hammond

[57] ABSTRACT

A polyurethane-urea composition is described that is highly resistant to textile fiber-dressings. The composition is a product from the reaction of an ester urethane prepolymer formed from the reaction of a diisocyanate and a hydroxy-terminated polyester of equivalent weight 400–1,000 in which the ratio of isocyanate functionality:hydroxy functionality is from 2.0:1 to 4.0:1; and an excess of water.

6 Claims, No Drawings

CHAIN EXTENDING POLYURETHANES WITH A LARGE EXCESS OF WATER

BACKGROUND OF THE INVENTION

1. Field of the Invention

This invention relates to novel polyurethane-urea compositions. It is more particularly concerned with novel linear polyurethane-urea compositions having high resistance to textile fiber-dressing solvents and a process for making such polyurethane ureas.

2. Description of the Prior Art

Polyurethanes have been recognized as high molecular weight polymeric materials exhibiting excellent resistance to abrasion, cut growth, oxidation and oils. These properties, combined with the fact of easy processability such as by extrusion or casting, make them well suited for the fabrication of complex parts. The thermoplastic polyurethanes are particularly useful in extrusion operations where high output rates of extrudate are desirable. Because of their ease of fabrication, the thermoplastic polyurethanes have found extensive use in the textile industry as aprons, belts, and the like on texturizing frames. While exhibiting comparatively long life in relation to the common materials found useful in this industry, the polyurethanes have generally suffered from a severe drawback due to their sensitivity to certain textile fiber-dressing solvents. These polymers gradually mechanically degrade in environments where contact with solvents, such as those of the polyethylene carboxylate type, for extended times at higher than ambient temperatures occurs. This mechanical degradation requires the part to be replaced, such replacement resulting in the economically disadvantageous shutdown of the textile machinery.

There is, therefore, a need to provide a thermoplastic polymer useful for textile industrial applications that has the desirable property of being resistant to fiber-dressing chemicals.

SUMMMARY OF THE INVENTION

It is one object of this invention to provide a polymeric material that is resistant to fiber-dressing chemicals.

It is a further object of the present invention to provide a thermoplastic polyurethane-urea that can be easily injection molded or extruded.

These and other objects of the present invention will also become apparent from the following detailed description of the preferred embodiments.

DESCRIPTION OF THE PREFERRED EMBODIMENTS

It has now been discovered that polymers containing a plurality of structure units of the formula

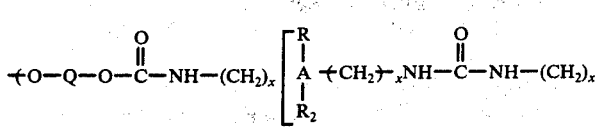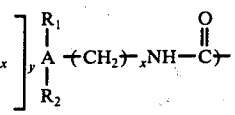

wherein Q represents the residue on removal of the terminal hydroxy group from a hydroxy-terminated polyester; A is phenylene, alkyl substituted phenylene, cycloalkylene or alkylene; $R_1$ and $R_2$ are selected from the group consisting of hydrogen, $C_1$-$C_6$ alkyl, or $C_1$ to $C_6$ alkoxy, $x$ is 0 or 1 and $y$ is at least 1.

Unexpectedly, the present novel thermoplastic polymers are polyurethane-ureas that are linear in nature and have good extrudability and capable of dissolving in dipolar aprotic solvents. They, therefore, can be molded, extruded or cast. These polyurethane-ureas have high resistance to textile fiber-dressing solvents. These solvents include the glycerol fatty acid esters such as glyceryl monoleate and glyceryl dioleate; the polyoxyalkylene fatty acid esters such as polyoxyethylene (20) tallow amine acidic phosphate ester of ethoxylated lauryl alcohol, polyoxyethylene sorbitan monooleate, polyoxyethylene (25) hydrogenated castor oil, polyoxyethylene (6) tridecyl ether; and the amide-containing fatty acids esters such as lauric myristic diethanolamide. These present novel compositions undergo substantially no swelling or other characteristic suggesting the diminution of physical properties when exposed to the above fiber-dressing solvents at elevated temperatures over extended periods of time. For example, at 50° C. and 48 hours, these polyurethane-ureas exhibit little swelling from common fiber-dressing solvents. Comparable polyurethane compositions undergo distortion, swelling and mechanical property loss under such conditions. The more common nitrile rubber materials, in many cases still being used as texturizing frames, are even more delicate, showing cracking and extensive swelling at 50° C. in a 48-hour period.

The novel polyurethane-urea compositions are prepared employing reaction conditions that are not conventional in the art. In the process in accordance with the present invention, an isocyanate-terminated prepolymer is first prepared by the reaction of a hydroxyterminated polyester with an excess of organic diisocyanate. Preferably, the latter reactant is employed in an amount so as to provide an NCO/OH ratio of 2.0:1 to 4.0:1, and especially of about 2.5:1 to about 3.0:1. It has been discovered that when NCO/OH ratios of greater than 4.0:1 are employed, the amount of urea in the final linear polymer is greater than about 46%. While resistant to the solvents in accordance with the present invention, these high urea content polymers are too stiff and inflexible to provide utility as elastomers. Conversely, if the NCO/OH ratio falls below 2.0:1, the urea content of the chain-extended polymer is less than 23% and solvent resistance is lost.

Prepolymer formation is carried out at temperatures of from about 40° to about 100° C., advantageously at about 60° to 70° C. The prepolymer can be formed in a solvent inert to isocyanate, such as xylene, benzene, toluene, and the like, or advantageously, the prepolymer can be formed in bulk (melt polymerization techniques).

The resultant isocyanate-terminated prepolymer composition is subsequently chain extended by reaction with excess water. By excess of water herein is intended to mean sufficient water to act as a chain extension agent, as well as a reaction heat modifier. Surprisingly, when very large excesses of water are used, rather than the common cross-linked polyurethane-urea predictively obtained, linear polyurethane-ureas result. Thus, at least a threefold excess of water based on the total residual NCO content of the prepolymer should be added in accordance with the present invention. While no particular upper limit above such excess lower limit is required, amounts of water over 20 times that necessary to react with the residual NCO content in the prepolymer creates volumes that are disadvantageously large. Preferably, the quantity of water added to the prepolymer is from 3 to 7 times that required to react with the residual NCO groups therein.

The chain extension reaction is generally regarded as exothermic, but due to the large amounts of water present, such exotherm is greatly depressed. Thus, the chain extension reaction is conveniently effected at 70° C. Temperatures over about 100° C. should be avoided. The resultant reaction mass is advantageously immediately removed from the reaction vessel, usually in the form of a slurry. The water is allowed to drain from such and, after drying, a polyurethane-urea crumb results.

Diisocyanates which are suitable for the preparation of the novel polyurethane-urea compositions in accordance with the present invention are those diisocyanates of which the following are typical examples: 2,4-toluene diisocyanate and 2,6-toluene diisocyanate. Unhindered aromatic diisocyanates, such as diphenylmethane diisocyanate and the like, should be avoided since these materials are so reactive that excessive heating within the prepolymeric reaction mass results and the products of the polymerization are difficult to process. Crosslinking and insolubility of the final polymer is the disadvantageous result.

Other organic diisocyanates found useful in the process of the present invention include, for example, tetramethylene diisocyanate, dodecamethylene diisocyanate, 3,3'-diisocyanato dipropyl ether, undecamethylene diisocyanate, furfurylidene diisocyanate, isophorone diisocyanate, di(isocyanato cyclohexyl)methane, 1,4-cyclohexane diisocyanate, meta-xylylene diisocyanate, p-xylylene diisocyanate, and tetramethyl p-xylylene diisocyanate. Mixtures of these and equivalent diisocyanates, including the lower alkyl, lower alkoxy and halogen derivatives of the foregoing isocyanates can also be employed.

Preferably, the xylylene diisocyanates and mixtures thereof are employed in accordance with the present invention.

Suitable diols for use in preparing the polyurethane-ureas in accordance with the present invention are the hydroxy-terminated polyesters of average equivalent weight of 400–1,000 (m.w. 800–2,000).

Suitable hydroxy-terminated polyesters are formed from the reaction of aliphatic diols and dicarboxylic acids. Examples of useful aliphatic diols include 1,4-butanediol, 1,6-hexanediol, and cyclohexane dimethanol. Examples of useful dicarboxylic acids include adipic acid, succinic acid, phthalic acid, isophthalic acid, maleic acid and the like. Those polyesters of preference are the hydroxy-terminated copolymers of 1,2-propylene glycol and succinic acid, 1,3-propylene glycol and succinic acid, 1,4-butylene glycol and dimethyl maleic acid, 1,3-propylene glycol and isophthalic acid, most preferably, ethylene glycol and adipic acid.

Preferably, the foregoing diols employed in the present process are of the polyester diols or mixtures of polyester diols of molecular weight within the range of about 960 to 1080, that is, an equivalent weight of 480 to 540.

In one embodiment of the present invention, the isocyanate-terminated polyester or polyether ester urethane obtained from the reaction of the foregoing aromatic diisocyanates and diols is dissolved in organic solvent such as tetrahydrofuran, acetonitrile, chloroform, and the like to form a solution of from about 10% to about 35%, preferably 15% to 25% prepolymer content. The particular solvent employed is not especially critical, but it is preferred that the solvent be unreactive with isocyanate groups and have adequate solvating ability for the prepolymer. It is also necessary that the solvent allow thorough mixing of the reactants to be effected before the polyurethane-urea reaction has proceeded to the point where the reaction product begins to precipitate out.

Preferably however, the final and chain-extended polyurethane-urea is produced by reacting the isocyanate-terminated polyester in bulk with water without any organic solvent present. Whether bulk or solution chain extension processes occur, mixing of the chain extender and prepolymer should be carried out for at least 30 minutes, preferably from 40 to 60 minutes is required to complete the reaction.

A separate solution of a suitable molecular weight modifier may also be incorporated into the solution. Such modifiers may be monofunctional isocyanates that react with the polyester or polyether ester diol or monofunctional amines which react with the prepolymer urethane isocyanate terminations. Among the latter molecular weight modifiers that may be employed are phenylisocyanate, p-toluene isocyanate and the like. The amine modifiers are selected from the group including diethyl amine, di-normal propyl amine, di-normal-butylamine, benzyl amine, and the like.

In order to prepare the linear polyurethane-urea materials in accordance with the present invention, the polyester diol is first added to the reaction vessel and heated to at least 60° C. The reaction vessel is a low intensity, dough-type kneader mixer such as, for example, a Baker-Perkins Mixer or the various Sigma-blade mixers. Any of a variety of conventional urethane catalysts are added at this time to accelerate the formation of the prepolymer. Typically, the catalyst can be organotin compounds, for example dibutyltin dilaurate or stannous octoate. The organic diisocyanate is then added to the vessel with mixing and the temperature of the resulting mixture is monitored. After the initial exotherm has moderated, e.g. to about 60°–100° C., the water chain extender is added. A period of about 2 to 30 minutes is required for such addition, preferably about 10 to 20, most preferably 15 minutes. After addition of the components is complete, stirring is continued for from about 2 to about 15 minutes or longer, preferably 4 to 10 minutes. The resulting polyurethane-urea is then transferred to a drying device, such as a tray or the like, and dried at reduced pressure. After solvent removal, the product may then be crumbled and is the desired thermoplastic polyurethane-urea.

Certain additives in appropriate amounts may be incorporated into the thermoplastic polyurethane-ureas at the appropriate point in the process. Such additives aid in processing the final polymer or contribute to its aesthetic appeal and include such materials as mold release agents, conventional fillers, colorants, stabilizers, and the like. Where soluble, such additives may be incorporated into one of the solutions used to form the final polyurethane-urea as long as such does not affect the chain-extension reaction. Otherwise, they may be incorporated in the final polymer by milling, for example.

The invention is more fully illustrated by the examples which follow.

EXAMPLE 1

Into a 5-gallon Baker Perkins Sigma blade mixer was charged 4,420 g. of polyethylene adipate (hydroxyl number 110, equivalent weight 510). The polyester was heated to 60° C. and 2,285 g. of xylylene diisocyanate containing 6.7 g. of dibutyltin dilaurate were added with stirring. The initial exotherm subsided within 15 minutes. To the prepolymer (at 60° C.) was added 1,000 g. of water over a period of 15 minutes, the temperature of the bulk polymer never being allowed to exceed 100° C. The contents of the vessel were stirred for an additional 15 minutes and the resulting slurry removed from the mixer. Excess water was decanted from the slurry. After preliminary drying at 60° C. under vacuum, the resulting larger particles of polymer were ground and vacuum dried at a temperature not exceeding 60° C.

EXAMPLE 2

Polyethylene adipate, 202 g., 0.4 eq., was dissolved in 1,220 ml toluene in a 3 liter resin kettle, and the solution dried by removing water as the azeotrope by distilling approximately 10% of the solvent. After cooling to 65°, xylylene diisocyanate, 105.2 g., 1.12 eq.'s (NCO/OH = 2.8) was added to the stirred solution, followed by 0.3 g. dibutyltin bis-octylthio glycolate. An exothermic reaction caused the temperature to rise to 78° in 5 minutes. The prepolymer reaction was completed by maintaining the temperature above 65° for an hour. The chain extension of the prepolymer was then carried out in the same vessel by the addition of 13.8 g., 1.54 equivalents of water (threefold excess), heating to 80° during 10 minutes and keeping the reaction mass at this temperature for 2 hours. Copious gas evolution ($CO_2$) was observed during the initial heating period. After cooling, the solvent was decanted and the white, solid polymer particles initially air dried before being placed in a vacuum oven at 60° overnight.

The following examples are illustrative of the swelling characteristics of the polymeric compositions in accordance with the present invention.

Swelling Test

A strip of test material 100 millimeters in length and approximately 7 millimeters wide (representative of the cordless textile twist belts employed as texturizing frames) is first measured to determine its average thickness and displacement in water. Displacement tests are carried out by immersion of the sample in water contained in a 50 milliliter burette with 0.1 milliliter increments and filled to the 40 milliliter mark with tap water. Thickness measurements are made with a handheld snap gauge calibrated in mils. These samples are then submerged in the selected textile dressing solvent at 250° or 75° F. for 3 hours and 72 hours, respectively. The treated samples are removed, dried, and thickness and volume displacement determinations repeated.

| Example[a] | Diisocyanate | Polyester (equivalent weight) | displacement NCO/OH | Tg °C. | Swelling[b] 250° F. | 75° F. |
|---|---|---|---|---|---|---|
| 3 | xylylene diisocyanate | ethylene adipate (505) | 2.8 | −31 | 38.5 | 8.3 |
| 4 | " | " | 2.65 | −30 | 26.2 | 12.5 |
| 5 | " | " (865) | 3.0 | −37 | 37.5 | 19.0 |
| 6 | " | " (505) | 3.0 | −30 | 42.8 | 4.7 |
| 7 | " | " | 2.5 | −31 | 29.0 (130° F.) | 7.8 |
| 8 | toluene diisocyanate (mixed isomers) | " | 2.8 | −24 | 28.6 | 7.1 |
| 9 | " | " | 3.0 | −34 | 15.4 | 12.9 |
| 10 | " | " | 3.0 | −25 | 12.5 | 14.3 |
| 11 | di(isocyanato cyclohexyl)methane | " | 3.0 | — | 29.4 | 8.3 |
| 12 | isophorone diisocyanate | " | 3.0 | −32 | 29.4 | 8.3 |
| Comparative | Mobay Chemical Texin 192A, a p,p'-methylene diphenylisocyanate | polybutylene adipate urethane | — | −40 (approx) | 52.1 | 15.5 |

[a]All samples were taken from cordless belts of the material produced from a laboratory extruder.
[b]All swelling data is obtained with the fiber dressing solvent Napcostat 2152P, a glyceryl oleate.
[c]Obtained by averaging data of four commercially obtained texturizing belts produced by Napco Chemical Company.

What is claimed is:

1. A method of producing a polyurethane-urea elastomer resistant to textile fiber dressing solvents which comprises the steps of:
   a. reacting a prepolymer having terminal isocyanate groups obtained by reacting
      1. a diisocyanate selected from the group consisting of xylylene diisocyanate, toluene diisocyanate, diisocyanato cyclohexyl methane and isophorone diisocyanate; with
      2. a difunctional, hydroxy-terminated polyester of equivalent weight 480–540,
   without solvent, in a low-intensity mixer with:
   b. water,
   wherein the quantity of said water is 3–20 times greater than necessary to react with said terminal isocyanate groups.

2. The method of claim 1 wherein the temperature of the reaction of said prepolymer and said water is from 70° C. to 100° C.

3. The method of claim 1 wherein said low-intensity mixer is a Sigma-blade mixer.

4. The method of claim 1 wherein said diisocyanate is meta-xylylene diisocyanate or para-xylylene diisocyanate.

5. The method of claim 1 wherein said difunctional, hydroxy-terminated polyester selected from the group poly(propylene succinate), poly(butylene dimethylmaleate), poly(propylene isophthalate) and poly(ethylene adipate).

6. The method of claim 1 wherein the NCO:OH ratio of said organic diisocyanate and said hydroxy-terminated polyester is from 2.0:1 to 4.0:1.

* * * * *